United States Patent
Du et al.

(10) Patent No.: US 11,947,152 B1
(45) Date of Patent: Apr. 2, 2024

(54) DISPLAY MODULE INCLUDING A THROUGH-HOLE AND PHOTOSENSITIVE ELEMENT AND A DISPLAY DEVICE INCLUDING THE SAME

(71) Applicant: TCL CHINA STAR OPTOELECTRONICS TECHNOLOGY CO., LTD., Guangdong (CN)

(72) Inventors: Yanying Du, Guangdong (CN); Jiangbo Yao, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/301,226

(22) Filed: Apr. 15, 2023

(30) Foreign Application Priority Data

Dec. 29, 2022 (CN) .......................... 202211717596.8

(51) Int. Cl.
*F21V 8/00* (2006.01)
*G02F 1/1333* (2006.01)
(Continued)

(52) U.S. Cl.
CPC ............ *G02B 6/004* (2013.01); *G02B 6/0043* (2013.01); *G02B 6/0051* (2013.01); *G02B 6/0055* (2013.01); *G02B 6/0058* (2013.01); *G02B 6/0083* (2013.01); *G02F 1/133314* (2021.01); *G02F 1/133524* (2013.01); *G02F 1/133615* (2013.01); *G02B 6/0088* (2013.01)

(58) Field of Classification Search
CPC ........................... G02B 6/0043; G02B 6/0061
See application file for complete search history.

(56) References Cited

U.S. PATENT DOCUMENTS

2011/0090142 A1 * 4/2011 You .................... G02B 6/0043
362/97.1
2012/0206669 A1 * 8/2012 Kim .................. G02F 1/133308
349/153
(Continued)

FOREIGN PATENT DOCUMENTS

CN 110208976 A * 9/2019

*Primary Examiner* — Keith G. Delahoussaye
(74) *Attorney, Agent, or Firm* — PV IP PC; Wei Te Chung; Zhigang Ma

(57) ABSTRACT

Provided are a display module and a display device. The display module includes a photosensitive element, a backlight unit, and a backlight. The backlight unit includes a first reflective sheet provided with a first opening corresponding to the photosensitive element, a light guide plate including a first region corresponding to the photosensitive element and a second region adjacent thereto, and an optical film provided with a second opening corresponding to the photosensitive element. A plurality of the microstructures are provided on a side of the light guide plate facing the photosensitive element. A distance between two adjacent columns of the microstructures in the first region is less than a distance between the two adjacent columns of the microstructures in the second region, or in a column of the microstructures, sizes of the microstructures in the first region are greater than sizes of the microstructures in the second region.

19 Claims, 3 Drawing Sheets

(51) Int. Cl.
*G02F 1/1335* (2006.01)
*G02F 1/13357* (2006.01)

(56) References Cited

U.S. PATENT DOCUMENTS

2021/0405446 A1* 12/2021 Yu .................... G02F 1/133331
2023/0296818 A1*  9/2023 Shiono ................... G02B 5/26
                                                            359/359

* cited by examiner

DISPLAY MODULE INCLUDING A THROUGH-HOLE AND PHOTOSENSITIVE ELEMENT AND A DISPLAY DEVICE INCLUDING THE SAME

TECHNICAL FIELD

The present application relates to the field of display technology, and in particular to a display module and a display device.

BACKGROUND

In the current wave of development of the display industry, more and more new display technologies, for example, the LCD technology and hard-screen AMOLED technology which are now mature technologies, have been developed and rapidly put into commercial use. In those technologies, under-screen camera is a new trend. A proportion of non-luminous area is raised in an under-screen camera based on OLED by reducing an anode area and simplifying a driving circuit, so as to improve transmittance. In LED display panels, requirements of under-screen camera are met by reducing a light-emitting area.

A current solution to realize under-screen camera in a LCD is forming a through-hole going through a backlight unit, disposing lamp beads in a ring shape in a camera area, using a high-transmittance RGBW display module, and optimizing hardware and software to ensure normal displaying of LCD module. However, the lamp beads in the ring shape lowers the display quality of the display module.

SUMMARY

A display module and a display device are provided in embodiments of the present application, which can improve display quality of display module.

An embodiment of the present application provides a display module, including:
- a first reflective sheet, provided with a first opening corresponding to the photosensitive element;
- a light guide plate, including a first region corresponding to the photosensitive element and a second region adjacent to the first region; and
- an optical film, provided with a second opening corresponding to the photosensitive element; and
- a backlight arranged at an end of the light guide plate;
- wherein a plurality of the microstructures are on a side of the light guide plate facing the photosensitive element, and a distance between two adjacent columns of the microstructures in the first region is less than a distance between the two adjacent columns of the microstructures in the second region, or in a column of the microstructures, sizes of the microstructures in the first region are greater than sizes of the microstructures in the second region.

Optionally, the plurality of the microstructures are arranged in an array;
in the second region, sizes of the microstructures arranged in a same column are same, distances between two adjacent columns of the microstructures gradually decrease, and/or sizes of the microstructures in columns gradually increase along a first direction from the backlight to the light guide plate.

Optionally, the photosensitive element is located at an end of the display module where the backlight is located, and the plurality of the microstructures are arranged in a first column, a second column, and a third column arranged along the first direction;
sizes of the microstructures of the first column in the first region are larger than sizes of the microstructures of the first column in the second region, the sizes of the microstructures of the first column in the first region are smaller than sizes of the microstructures of the second column in the second region, and sizes of the microstructures of the second column in the first region are greater the than sizes of the microstructures of the second column in the second region and less than sizes of the microstructures of the third column in the second region.

Optionally, the photosensitive element is located at an end of the display module where the backlight is located, and the plurality of the microstructures are arranged in a first column, a second column, and a third column arranged along the first direction;
a first distance between the first column and the second column in the first region is less than a second distance between the first column and the second column in the second region, and the first distance is greater than a third distance between the second column and the third column in the second region.

Optionally, the photosensitive element is arranged on a first end opposite to a second end where the backlight is located, the plurality of the microstructures are arranged in a first column and a second column arranged along the first direction; sizes of the microstructures of the first column in the first region are greater than sizes of the microstructures of the first column in the second region, and sizes of the microstructures of the second column in the first region are less than sizes of the microstructures of the second column in the second region.

Optionally, the photosensitive element is arranged on a first end opposite to a second end where the backlight is located, and the plurality of the microstructures are arranged in a first column and a second column arranged along the first direction; a distance between the first column and the second column in the first region is greater than a distance between the first column and the second column in the second region.

Optionally, the display module further includes:
a second reflective sheet arranged on a side of the light guide plate away from the backlight and correspondingly to the backlight.

A display module is also provided, including a photosensitive element, a backlight unit, and a backlight, wherein the backlight is arranged on a side of the light guide plate, and the backlight unit includes:
- a reflective sheet defined with a first opening corresponding to the photosensitive element;
- a first optical film defined with a second opening corresponding to the photosensitive element;
- a light guide plate and a transflective lens defined with a third opening therebetween corresponding to the photosensitive element; and
- a second optical film disposed in the third opening, wherein the second optical film is disposed on a side of the light guide plate facing away from the backlight, the second optical film is connected to the first optical film, the transflective lens is disposed on a side of the second optical film facing away from the backlight, and an orthographic projection of the photosensitive element on the transflective lens is within the transflective lens.

Optionally, the first optical film includes a first diffusion sheet, a first concentrating sheet, second concentrating sheet, and second diffusing sheet arranged sequentially in a second direction from the reflective sheet to the light guide plate;

the second optical film includes a third diffusing sheet connected to the first diffusing sheet, a third concentrating sheet connected to the first concentrating sheet, a fourth concentrating sheet connected to the second concentrating sheet, and a fourth diffusing sheet connected to the second diffusing sheet; and the third diffusing sheet, the third concentrating sheet, the fourth concentrating sheet, and the fourth diffusing sheet are sequentially arranged along a first direction from the backlight to the light guide plate.

Optionally, the display module further includes a housing for accommodating the backlight unit, wherein a through-hole is defined in the housing at a position corresponding to the photosensitive element, and the photosensitive element is disposed in the through-hole.

A display device is further provided, including a display panel and the display module above-mentioned, and the display panel is located on a light-emitting side of the display module.

Beneficial effects according to the embodiments: according to the display module according to the embodiments of the present application, the display module includes the photosensitive element, the backlight unit, and the backlight, the backlight unit includes a first reflective sheet, a light guide plate, and an optical film arranged in sequence. The first reflective sheet is provided with a first opening corresponding to the photosensitive element. The optical film is provided with a second opening corresponding to the photosensitive element. By providing the first opening and the second opening on both sides of the light guide plate, it is possible to avoid blurring of images captured by the display module due to matte surface of the backlight unit, thereby improving the clarity of the images. Compared to the prior art in which a ring-shaped lamp strip is required in the though-hole provided in the light guide plate to compensate for light, no through-hole is provided in a position of the light guide plate corresponding to the photosensitive element in the present application, therefore no ring-shaped lamp strip is required for light compensation, thus simplifying structure of the display module. Moreover, a distance between two adjacent columns of the microstructures in the first region is less than a distance between the two adjacent columns of microstructures in the second region, or in a column of the microstructures, sizes of the microstructures in the first region are greater than sizes of the microstructures in the second region, a density of the microstructures in the first region is greater than a density of the microstructures in the second region, resulting in a better light-guiding in the first region than in the second region to compensate for reflection loss due to the first opening in the first reflective sheet to uniform light emitted from the backlight and further improve quality of display images.

BRIEF DESCRIPTION OF THE DRAWINGS

In order to more clearly explain the technical solution in the embodiment of the present application, the attached drawings needed in the description of the embodiment will be briefly introduced below. It is obvious that the drawings in the following description are only some embodiments of the present application. For those skilled in the art, other drawings can also be obtained from these drawings without any creative work.

In order to better understand the present application and its beneficial effects, the following will be explained in combination with the attached drawings. In the following description, the same reference numerals refer to the same parts.

DETAILED DESCRIPTION

Figure 1:
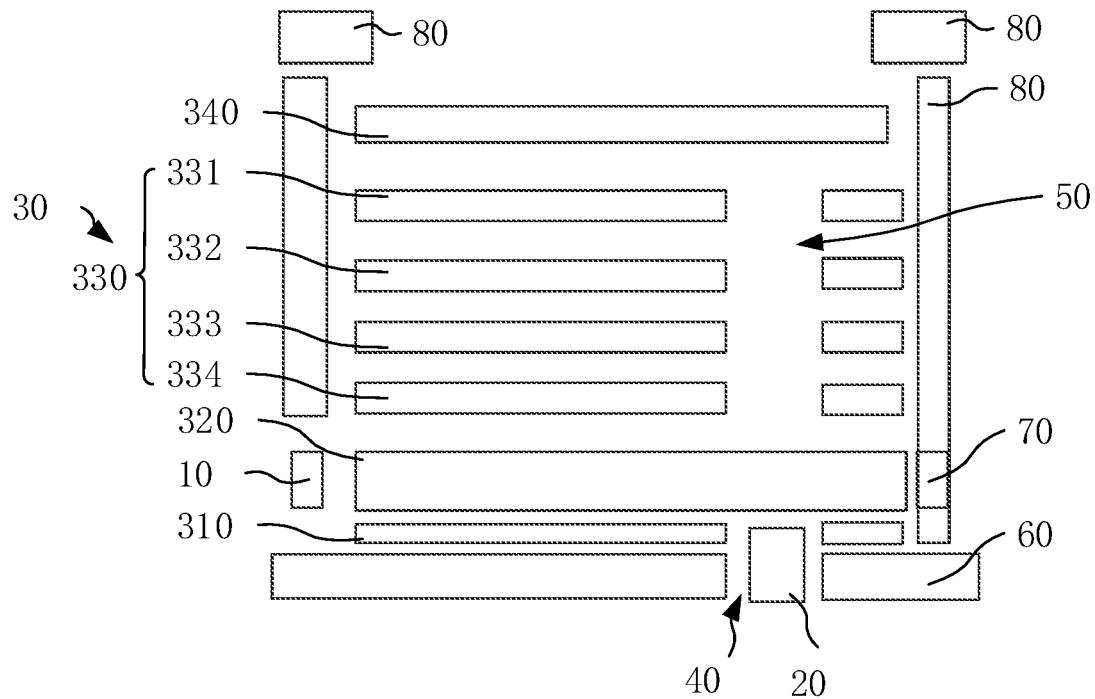
FIG. 1 is a schematic diagram of a first structure of a display module according to an embodiment of the present application.

The following describes implementations in detail. Examples of the implementations are illustrated in the accompanying drawings, where throughout the specification the same or like reference numerals represent the same or like elements or elements having the same or similar functions. The implementations described below with reference to the accompanying drawings are exemplary and merely intended to explain the disclosure rather than limit the disclosure.

In the following description, it should be understood that directions or positional relationships indicated by terms "center", "longitudinal", "transverse", "length", "width", "thickness", "upper", "lower", "front", "rear/back", "left", "right", "vertical", "horizontal", "top", "bottom", "inner", "outer", "clockwise", and "counterclockwise" are based on directions or positional relationships illustrated in the accompany drawings. The terms are merely for the convenience of describing the disclosure and simplifying the description, and do not indicate or imply that the device or elements indicated must have a specific orientation and need to be constructed and operated in the specific orientation. Therefore, the terms cannot be understood as a restriction on this disclosure. In addition, terms "first", "second", and the like are merely used for describing purposes, and cannot be understood as indicating or implying relative importance or implicitly indicating the number of indicated technical features. Therefore, the features defined with "first" and "second" may explicitly or implicitly include one or more of the features. In the description of the disclosure, "multiple/a plurality of/a number of" means two or more than two, unless otherwise specifically defined.

As a light-modulating and grating-like display component, a LCD needs a backlight. However, due to its relatively low transmittance and diffraction caused by the application of a basic 2T1C circuit and a color film substrate, there is a so-called fly screen effect when capturing images through the LCD screen body, and there also exists a problem of display image overlapping with the images.

A current solution to realize under-screen camera in a LCD is forming a through-hole going through a backlight unit, disposing lamp beads in a ring shape in a camera area, using a high-transmittance RGBW display module, and optimizing hardware and software to ensure normal displaying of LCD module. Advantages of the solution are that the structure is fully optimized according to needs of the camera, light transmission is guaranteed as much as possible, and the pressure to optimize algorithm of photography is relieved. On the other hand, disadvantages are that such kind of backlight unit has a poor compatibility with general LCD panels, display quality is largely sacrificed due to the design of RGBW, and the lamp beads in the ring shape also complicates structure of the backlight module and increases cost of the backlight module.

Therefore, in order to solve at least one of the above problems, the present application provides a display module and a display device. The present application will be further described below in conjunction with the accompanying drawings and embodiments.

Figure 2:
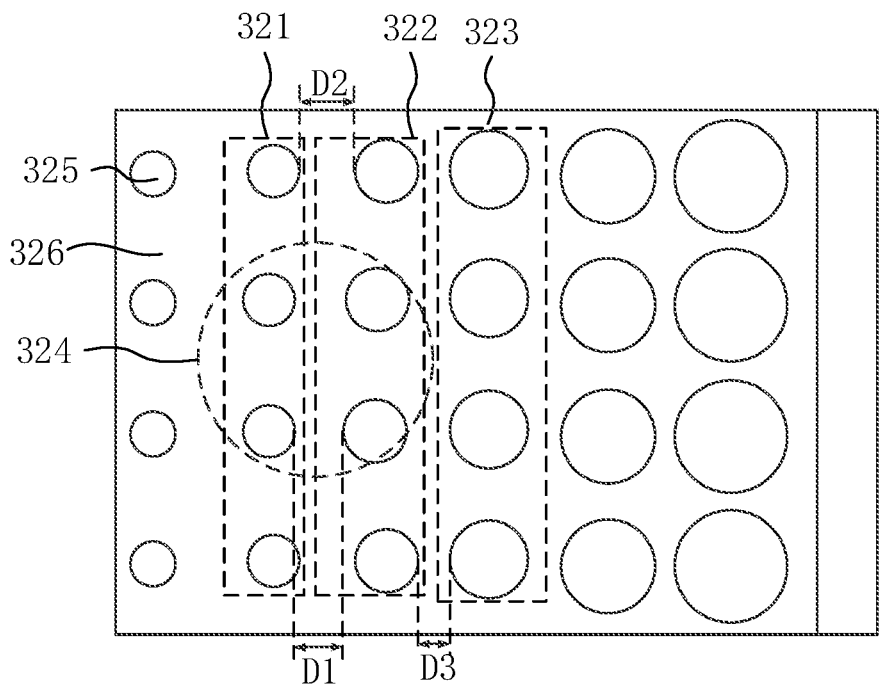
FIG. 2 is a schematic diagram of a first structure of a light guide plate in the display module shown in FIG. 1.

Please refer to FIG. 1 and FIG. 2, FIG. 1 is a schematic diagram of a first structure of the display module according to an embodiment of the present application, and FIG. 2 is a schematic diagram of a first structure of a light guide plate in the display module shown in FIG. 1. A display module 100 is provided by an embodiment of the present application, which includes a photosensitive element 20, a backlight unit 30 and a backlight 10. The backlight 10 is a side-emitting light source. The backlight unit 30 includes a first reflective sheet 310, a light guide plate 320, and a first optical film 330 arranged in sequence. The light guide plate 320 has a light incident surface and a light-emitting surface. The light incident surface of the light guide plate 320 faces the first optical film 330. The light-emitting surface of the light guide plate 320 faces the first optical film 330. The first reflective sheet 310 is provided with a first opening 40 corresponding to the photosensitive element 20. The optical film 320 is provided with a second opening 50 corresponding to the photosensitive element 30. The light guide plate 330 includes a first region 324 corresponding to the photosensitive element 20 and a second region 326 adjacent to the first region 324. A plurality of the microstructures 325 are provided on a side of the light guide plate 320 facing the photosensitive element 20. The plurality of the microstructures 325 may be arranged in an array and may be arranged in a scattered manner according to actual needs. The embodiments of the present application are illustrated taking that the plurality of the microstructures 325 are arranged in an array as examples. In the embodiments of the present application, a distance between two adjacent columns of the microstructures 325 in the first region 324 is different with a distance between the two adjacent columns of the microstructures 325 in the second region 326, and/or in a column of the microstructures 325, sizes of the microstructures 325 in the first region 324 are different with sizes of the microstructures 325 in the second region 326. According to the embodiment of the present application, a distance between two adjacent columns of the microstructures 325 in the first region 324 is different with a distance between the two adjacent columns of the microstructures 325 in the second region 326, and/or in a column of the microstructures 325, sizes of the microstructures 325 in the first region 324 are different with sizes of the microstructures 325 in the second region 326, therefore a density of the microstructures 325 in the first region 324 is different from a density of the microstructures 325 in the second region 326, resulting in different light-guiding between the first region 324 and the second region 326 to compensate for reflection loss due to the first opening 40 in the first reflective sheet 310 to uniform light from the backlight and further improve quality of display images. In addition, compared to the prior art in which a through-hole is needed to be defined in the light guide plate and a ring-shaped lamp strip is needed to be disposed in the though-hole to compensate for light to realize a under-screen camera, no through-hole is provided in a position of the light guide plate 320 corresponding to the photosensitive element 20, therefore no ring-shaped lamp strip is needed for light compensation, thus simplifying structure of the display module.

It should be noted that the microstructure 325 is a nano-scale protruding structure, the microstructure 325 is capable of scattering light. A cross-section may be in any shape for example, a triangle, a trapezoid, a circle, or an irregular shape, etc. A shape of a projection of the microstructure 325 on the light guide plate 320 may be one of a square, a rectangle, a circle, a ring, or a triangle. That is, a shape of a bottom surface of the microstructure 325 may be a square, a rectangle, a circle, a ring or a triangle. Correspondingly, a shape of the microstructure 325 may be one of a regular quadrangular pyramid, a quadrangular pyramid, a cone or a triangular pyramid. The shape of the microstructure 325 maybe designed basing on actual situation, and there are no specific restrictions here.

It should be noted that the size of the microstructures 325 in the embodiments of the present application refers to an area of an orthographic projection of the microstructure 325 on the light guide plate 320, and the distance between two adjacent microstructures 325 refers to the shortest distance between the two adjacent microstructures 325.

A surface of the first reflective sheet 310 and a surface of the first optical film 330 are both matte surfaces. Matte surfaces can change the backlight 10 from a point light source into a surface light source to make light more uniform. By providing the second opening 50 on a side of the light-emitting surface of the light guide plate 320 and the first opening 40 on the other side of the light-guiding plate 320 opposite to the light-emitting surface, it is possible to avoid blurring of images captured by the display module due to the matte surfaces of the backlight unit, when the photosensitive element 20 is a camera or an image sensor, thereby improving clarity of the images.

It can be understood that, in the embodiment of the present application, by providing the second opening 50 on a light-emitting side of the light guide plate 320 and the first opening 40 on a light incident side of the light-guiding plate 320 opposite to the light-emitting side, under-screen photosensitive element 20 in the display panel is realized, which also improves clarity of the images captured by the photosensitive element 20. On this basis, according to the embodiment of the present application, by adjusting the distance between the microstructures 325 and/or the sizes of the microstructures 325, the density between the microstructures 325 in the first region 324 and the density between the microstructures 325 in the second region 326 on the light guide plate 320 are different, which solves the problem of light nonuniformity due to the first opening 40 provided in the first reflective sheet 310, and improves clarity of the display images. There is no need to provide a ring light strip in the display module provided by the embodiment of the present application, thereby simplifying structure of the display module. Therefore, the display module according to the embodiment of the present application not only realizes under-screen photosensitive element 20, but also guarantees quality of display images, and simplifies structure of the display module.

Please refer to FIG. 2 again, in the second region 326, sizes of the microstructures 325 arranged in a same column are same, distances between two adjacent columns of the microstructures 325 gradually decreases, and/or sizes of the microstructures in columns gradually increase along a first direction from the backlight to the light guide plate.

Exemplarily, in some embodiments, the sizes and the shapes of the plurality of microstructures 325 in a same column in the second region 326 are same, and the distances between two adjacent columns of the microstructures 325 gradually decrease along the first direction. In some other embodiments, the sizes and shapes of the plurality of microstructures 325 in the same column in the second region 326 are same, and the sizes of the microstructures 325 in two adjacent columns gradually increase along the first direction, so as to compensate for light in region further away from the backlight 10, so that the light emitted from the light guide plate 320 is more uniform. It should be noted that the specific embodiments need to be designed according to actual application, the distances between the microstructures 325 in two adjacent columns may gradually decrease, or the sizes of the microstructures 325 in columns may gradually increase, or the distances between the microstructures 325 in two adjacent columns may gradually decrease while the sizes of the microstructures 325 in columns may gradually increase, which is not specifically limited here.

In at least one column of the microstructures 325, sizes of the microstructures 325 in the first region 324 are greater than sizes of the microstructures 325 in the second region 326. It can be understood that, in at least one column of the microstructures 325, sizes of the microstructures 325 in the first region 324 are greater than sizes of the microstructures 325 in the second region 326, so that the distance between the adjacent microstructures 325 in the first region 324 is decreased, thereby increasing the density of the microstructures 325 in the first region 324, improving light diffusion of the microstructures 325, thereby compensating reflection loss due to the first opening 40 provided in the first reflective sheet 310, which makes the light emitted from the light guide plate 320 more uniform.

Exemplarily, in some embodiments, as shown in FIG. 2, when the photosensitive element 20 is disposed on a side closer to the backlight 10. The light guide plate 320 is sequentially provided with a first column 321 of the microstructures 325, a second column 322 of the microstructures 325, and a third column 323 of the microstructure 325 along the first direction. The first column 321 of the microstructures 325 and the second column 322 of the microstructures 325 are disposed in the first region 324 corresponding to the photosensitive element 20 and the second region 326. A first distance D1 between the first column 321 of the microstructures 325 and the second column 322 of the microstructures 325 in the first region 324 is less than a second distance D2 between the first column 321 of the microstructures 325 and the second column 322 of the microstructures 325 in the second region 326, and the first distance D1 is greater than a third distance D3 between third column 323 of the microstructure 325 and the second column 322 of the microstructures 325 in the second region 326 The distance between adjacent columns of the microstructures 325 in the first region 324 is smaller, light diffusion can be appropriately enhanced, thereby compensating for reflection loss due to the opening provided in the first reflective sheet 310.

It should be noted that the first distance D1 between adjacent columns of the microstructures 325 in the first region 324 needs to be greater than the third distance D3, so as to avoid inconsistence between the light emitted by the light guide plate 324 in the first region 324 and other regions due to an excessive increasing in light diffusion in the first region 324, to ensure that the light emitted from the light guide plate 320 is uniform.

Figure 3:
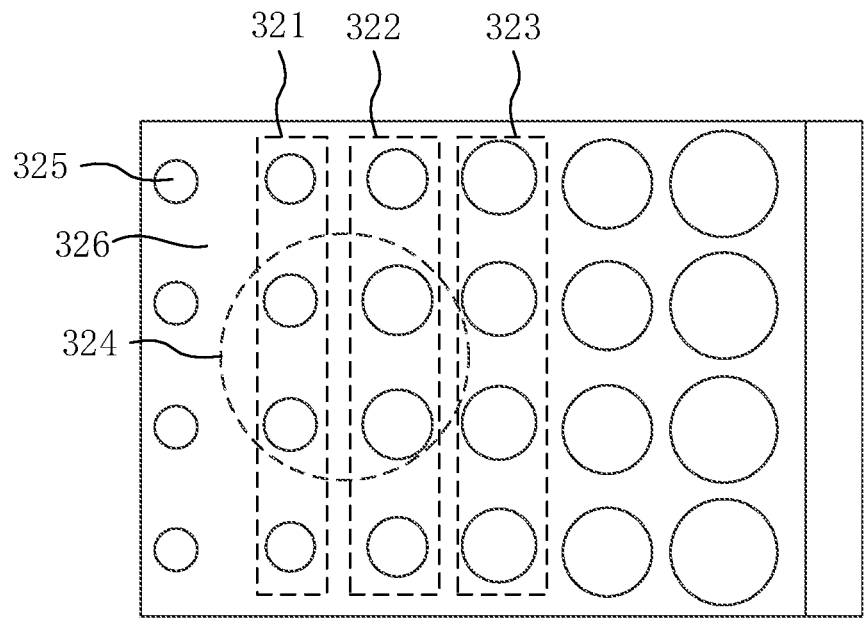
FIG. 3 is a schematic diagram of a second structure of the light guide plate in the display module shown in FIG. 1.

Please continue to refer to FIG. 3, FIG. 3 is a schematic diagram of a second structure of the light guide plate in the display module shown in FIG. 1. In some other embodiments, the photosensitive element 20 is arranged on a side closer to the backlight 10. The light guide plate 320 is sequentially provided with a first column 321 of the microstructures 325, a second column 322 of the microstructures 325, and a third column 323 of the microstructure 325 along the first direction. Sizes of the microstructures 325 of the first column 321 in the first region 324 are larger than sizes of the microstructures 325 of the first column 321 in the second region 326, the sizes of the microstructures 325 of the first column 321 in the first region 324 are smaller than sizes of the microstructures 325 of the second column 322 in the second region 326, and sizes of the microstructures 325 of the second column 322 in the first region 324 are greater the than sizes of the microstructures 325 of the second column 322 in the second region 326 and less than sizes of the microstructures 325 of the third column 323 in the second region 326. Sizes of the microstructures 325 of the first column 321 in the first region 324 are larger than the sizes of the microstructures 325 of the first column 321 in the second region 326, that is, by increasing the sizes of the microstructures 325 in the first region 324, light diffusion of the first region 324 can be enhanced, thereby compensating for reflection loss due to the opening provided in the first reflective sheet 310.

It should be noted that the sizes of the microstructures 325 of the first column 321 in the first region 324 are smaller than sizes of the microstructures 325 of the second column 322 in the second region 326, and sizes of the microstructures 325 of the second column 322 in the first region 324 are greater the than sizes of the microstructures 325 of the second column 322 in the second region 326 and less than sizes of the microstructures 325 of the third column 323 in the second region 326, so that a quantity of the microstructures 325 in the first region 324 gradually increase in the first direction to increase light diffusion, and uniformity of the light emitted from the light guide plate 320 is guaranteed, avoiding nonuniform of the light emitted by the light guide plate 320 due to a greater light diffusion of the first region 324 than that in the second region 326 caused by that the sizes of the microstructures 325 in the first region 324 are excessively larger than the microstructure 325 in other regions.

Figure 4:
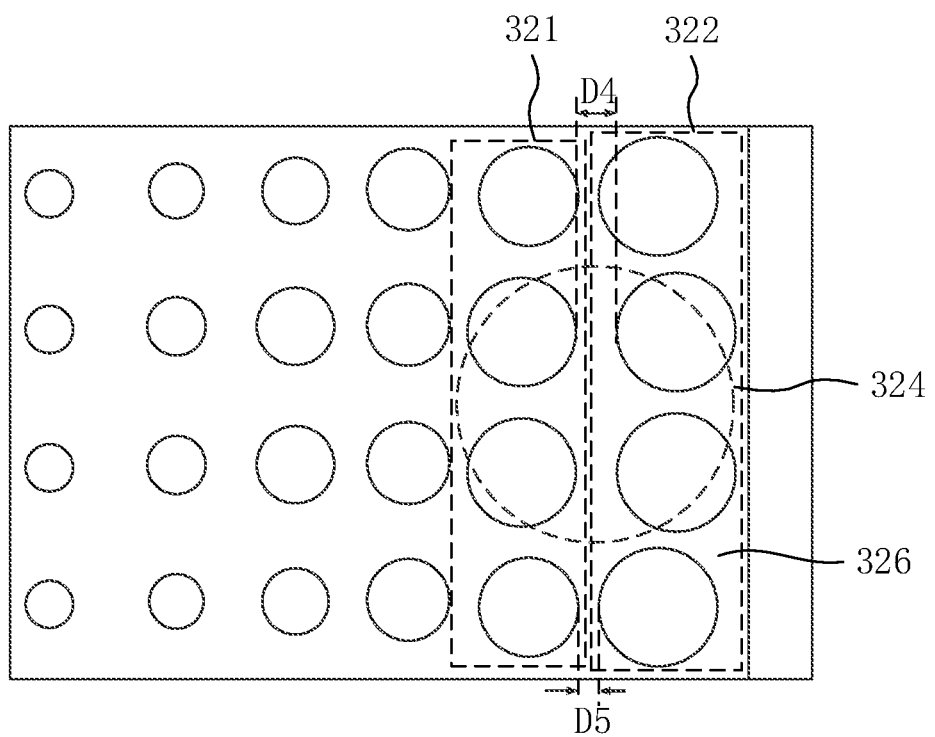
FIG. 4 is a schematic diagram of a third structure of the light guide plate in the display module shown in FIG. 1.

Please continue to refer to FIG. 4, which is a schematic diagram of a third structure of the light guide plate in the display module shown in FIG. 1. In some embodiments, the photosensitive element 20 is disposed on a side further away from the backlight 10. In the first direction, the plurality of microstructures 325 include a first column 321 of the microstructures 325 and a second column 322 of the microstructures 322. The first column 321 of the microstructure 325 and the second column 322 of the microstructures 325 are provided in the first region 324 corresponding to the photosensitive element 20 and the second region 326. A fourth distance D4 between the first column 321 of the microstructures 325 and the second column 322 of the microstructures 325 in the first region 324 is greater than a fifth distance D5 between the first column 321 of the microstructures 325 and the second column 322 of the microstructures 325 in the second region 326. The fourth distance D4 between the first column 321 of the microstructures 325 and the second column 322 of the microstructures 325 in the first region 324 are greater than the fifth distance D5, light deflected to an edge at the end of the light guide plate 320 further away from the backlight 10 can be reduced, so that more light is utilized, which prevents light from diffusing to the edge and being absorbed by the black frame 80.

Figure 5:
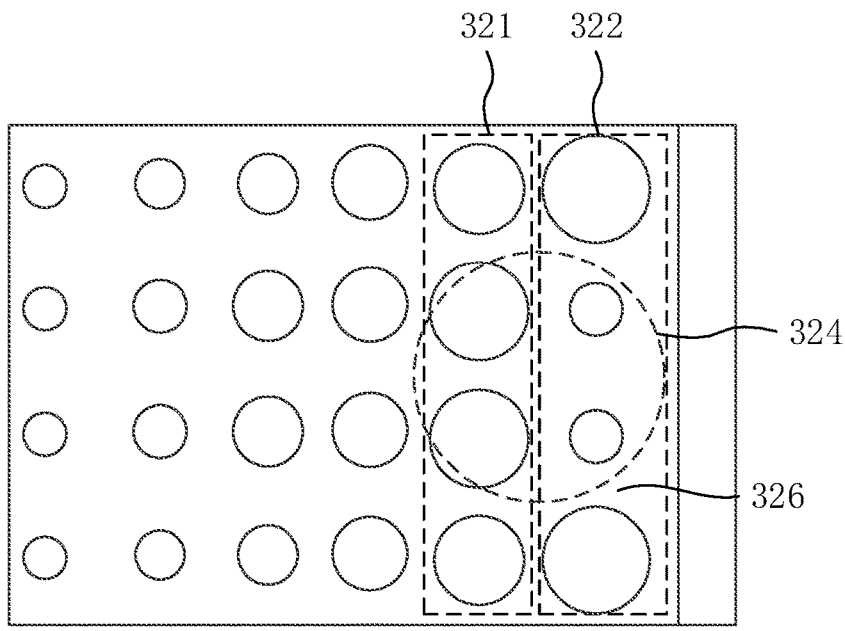
FIG. 5 is a schematic diagram of a fourth structure of the light guide plate in the display module shown in FIG. 1.

Please refer to FIG. 5, which is a schematic diagram of a fourth structure of the light guide plate in the display module shown in FIG. 1. In some embodiments, the photosensitive element 20 is disposed on a side further away from the backlight 10. In the first direction, the plurality of microstructures 325 include a first column 321 of the microstructures 325 and a second column 322 of the microstructures 325. Sizes of the microstructures 325 in the first column 321 in the first region 324 are larger than the sizes of the microstructures 325 in the first column 321 in the second region 326, and sizes the microstructures 325 in the second column 322 in the first region 324 are smaller than sizes of the microstructures 325 in the second column 322 in the second region 326. The sizes of the microstructures 325 in the first column 321 in the first region are larger than the sizes of the microstructures 325 in the first column 321 in the second region 326, that is, by increasing the sizes of the microstructures 325 in the first region 324 which are closer to the backlight 10 to compensate for reflection loss due to the first opening in the first reflective sheet 310, so as to raise the uniformity of light. The sizes the microstructures 325 in the first column 322 in the second region 326 are smaller than sizes of the microstructures 325 in the second column 322 in the second region 326, so as to reduce light from diffusing to the edge through the microstructures 325, reducing light absorption by the black frame 80 at the edge, so that more light is utilized.

It should be noted that, in some embodiments, the display module 100 further includes a second reflective sheet 70 disposed on the end of the light guide plate 320 further away from the backlight 10. The second reflective sheet 70 is disposed corresponding to the backlight 10. That is, the second reflective sheet 70 and the backlight 10 are arranged at both ends of the light guide plate 320, respectively. Through the second reflective sheet 70, reflection loss caused by the first opening 40 provided in the first reflective sheet 310 can be compensated to further uniform the backlight, the light diffused to the edge can be reflected back through the second reflective sheet 70, so that more light can be utilized and the loss of light can be reduced.

In some embodiments, the surface of the second reflective sheet 70 is a matte surface, and a point light source can be changed into a surface light source by the matte surface, making light softer and more uniform.

Figure 6:
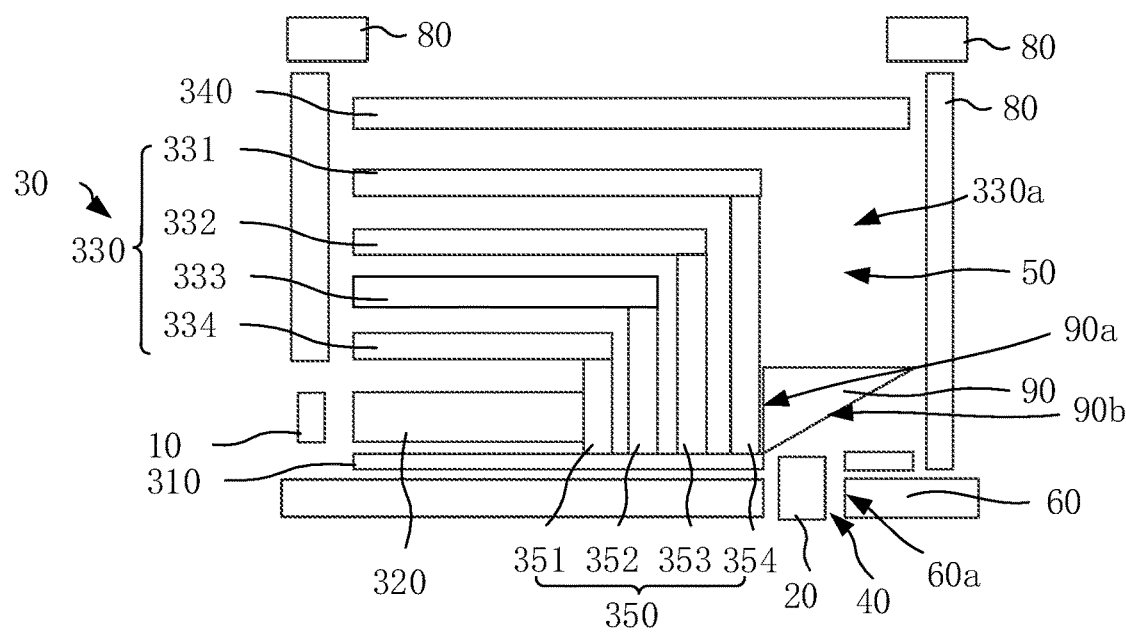
FIG. 6 is a schematic diagram of a second structure of the display module according to another embodiment of the present application.

Please refer to FIG. 6, which is a schematic diagram of a second structure of the display module according to another embodiment of the present application. A display module 100 includes a photosensitive element 20, a backlight unit 30, and a backlight 10. The backlight unit 30 includes a first reflector 310, a first optical film 330, and a light guide plate 320, the second optical film 350, and the transflective lens 90. The transflective lens 90 includes a light inlet surface 90a and an inclined plane 90b facing the light inlet surface 90a. The inclined plane 90a is disposed further away from the light guide plate 320 than the light inlet surface 90a. The light inlet surface 90a is translucent, while the inclined plane 90b is a reflective. Optionally, the inclined plane is a total reflection surface. The light guide plate 320 has a light incident surface and a light-emitting surface, the light incident surface of the light guide plate 320 faces the backlight 10, and the light-emitting surface of the light guide plate 320 faces the first optical film 330. The first reflective sheet 310 is provided with a first opening 40 corresponding to the photosensitive element 20. The first optical film 330 is provided with a second opening 50 corresponding to the photosensitive element 20. The light guide plate 330 is defined with a third opening 330a corresponding to the photosensitive element 20. The second optical film 350 and the transflective lens 90 are arranged in the third opening 330a. The second optical film 350 is arranged on a side of the light guide plate 320 facing away from the backlight 10. The second optical film 350 and the first optical film 330 are connected to each other. The transflective lens 90 is arranged on the side of the second optical film 350 facing away from the backlight 10, and an orthographic projection of the photosensitive element 20 on the transflective lens 90 is within an orthographic projection of the transflective lens 90. In the embodiment of the present application, under-screen photosensitive element is realized by providing the first opening 40 and the second opening 50, clarity of the images captured by the display module 100 is improved. The second optical film 350 and the transflective lens 90 are arranged in the third opening, and the orthographic projection of the photosensitive element 20 locates within the orthographic projection of the transflective lens 90. Therefore, light emitted by the backlight 10 passes through the light guide plate 320, then part of the light passes through the first optical film 330 and uniformly diffused, while another part of the light passes through the light guide plate 320 and the second optical film 350 in sequence, and then uniformly emits through the transflective lens 90. Therefore, it makes the display device of 20 with the under-screen photosensitive element emits light uniformly, which improves the qualities of the displayed images.

The first optical film 330 includes a first diffusing sheet 334, a first concentrating sheet 333, a second concentrating sheet 332, and a second diffusing sheet 331 arranged sequentially in the second direction from the first reflecting sheet 310 to the light guide plate 320.

The second optical film 350 includes a third diffusing sheet 351 connected to the first diffusing sheet 334, a third concentrating sheet 352 connected to the first concentrating sheet 333, a fourth concentrating sheet 353 connected to the second concentrating sheet 332, and the fourth diffusion sheet 354 connected to the second diffusion sheet 331. The third diffusing sheet 351, the third concentrating sheet 352, the fourth concentrating sheet 353, and the fourth diffusing sheet 354 are sequentially arranged along the first direction from the backlight 10 to the light guide plate 320.

It should be noted that the surfaces of the first optical film 330 and the second optical film 350 are both matte, so that light will be scattered after passing through them, and the distribution information carried by the light will disappear.

The display module 100 also includes a housing 60 for accommodating the backlight unit 30. The housing 60 is provided with a through-hole corresponding to the photosensitive element 20. The photosensitive element 20 is provided on a side of the through-hole facing away from the light-emitting surface of the backlight unit 30.

It should be noted that the photosensitive element 20 is used for two-dimensional or three-dimensional object feature recognition, or two-dimensional or three-dimensional image rendering, or photographing and video recording. The photosensitive element 20 may include a visible light camera, which may be used to receive visible light and generate a corresponding image. In some other embodiments, the photosensitive element 20 may also be an invisible light sensing module, for example, an infrared sensor module. The photosensitive element 20 may be used to take photos or videos, and can be used in, for example but not limited to, taking selfie, recording video, videophone call, conference call, live broadcast, etc. Optionally, the photosensitive element 20 may be used in two-dimensional or three-dimensional image drawing, for example but not limited to, building structure drawing, map drawing, holographic image, etc. Optionally, the photosensitive element 20 may be used in object feature recognition, for example but not limited to, fingerprint recognition, face recognition, iris recognition, etc.

The display module 100 further includes a protective film 340 with high transmittance. The protective film 340 is disposed on a side of the first optical film 330 facing away from the light guide plate 320 for protecting the backlight unit 30.

The embodiment of the present application also provides a display device, including a display panel and the display module 100 described as any one of the above, and the display panel is located on a light-emitting side of the display module 100.

The display module and the display device according to the embodiments of the present application have been introduced in detail above. In this paper, specific examples are used to illustrate the principles and embodiments of the present application, and the descriptions of the above embodiments are only used to help understand the present application. At the same time, for those skilled in the art, based on the idea of this application, there will be changes in the specific embodiments and application scope. In summary, the content of this specification should not be construed as limiting the application.

What is claimed is:

1. A display module, comprising:
   a photosensitive element;
   a backlight unit, comprising:
   a first reflective sheet, provided with a first opening corresponding to the photosensitive element;
   a light guide plate, comprising a first region corresponding to the photosensitive element and a second region adjacent to the first region; and
   an optical film, provided with a second opening corresponding to the photosensitive element; and
   a backlight arranged at an end of the light guide plate;
   wherein a plurality of the microstructures are provided on a side of the light guide plate facing the photosensitive element, and a distance between two adjacent columns of the microstructures in the first region is less than a distance between the two adjacent columns of the microstructures in the second region, or
   in a column of the microstructures, sizes of the microstructures in the first region are greater than sizes of the microstructures in the second region, and
   wherein the light guide plate does not have an opening.

2. The display module according to claim 1, wherein the plurality of the microstructures are arranged in an array;
   in the second region, sizes of the microstructures arranged in a same column are same, distances between two adjacent columns of the microstructures gradually decrease, or sizes of the microstructures in columns gradually increase along a first direction from the backlight to the light guide plate.

3. The display module according to claim 2, wherein the photosensitive element is located at an end of the display module where the backlight is located, and the plurality of the microstructures are arranged in a first column, a second column, and a third column arranged along the first direction;
   sizes of the microstructures of the first column in the first region are larger than sizes of the microstructures of the first column in the second region, the sizes of the microstructures of the first column in the first region are smaller than sizes of the microstructures of the second column in the second region, and sizes of the microstructures of the second column in the first region are greater the than sizes of the microstructures of the second column in the second region and less than sizes of the microstructures of the third column in the second region.

4. The display module according to claim 3, wherein the photosensitive element is located at an end of the display module where the backlight is located, and the plurality of the microstructures are arranged in a first column, a second column, and a third column arranged along the first direction;
   a first distance between the first column and the second column in the first region is less than a second distance between the first column and the second column in the second region, and the first distance is greater than a third distance between the second column and the third column in the second region.

5. The display module according to claim 2, wherein the photosensitive element is arranged on a first end opposite to a second end where the backlight is located, the plurality of the microstructures are arranged in a first column and a second column arranged along the first direction;
   sizes of the microstructures of the first column in the first region are greater than sizes of the microstructures of the first column in the second region, and sizes of the microstructures of the second column in the first region are less than sizes of the microstructures of the second column in the second region.

6. The display module according to claim 2, wherein the photosensitive element is arranged on a first end opposite to a second end where the backlight is located, and the plurality of the microstructures are arranged in a first column and a second column arranged along the first direction;
   a distance between the first column and the second column in the first region is greater than a distance between the first column and the second column in the second region.

7. The display module according to claim 5, further comprising: a second reflective sheet arranged on a side of the light guide plate away from the backlight and correspondingly to the backlight.

8. The display module according to claim 6, further comprising a second reflective sheet arranged on a side of the light guide plate away from the backlight and correspondingly to the backlight.

9. A display module, comprising a photosensitive element, a backlight unit, and a backlight, wherein the backlight is arranged on a side of the light guide plate, and the backlight unit comprises:
   a reflective sheet defined with a first opening corresponding to the photosensitive element;
   a first optical film defined with a second opening corresponding to the photosensitive element;
   a light guide plate and a transflective lens defined with a third opening therebetween corresponding to the photosensitive element; and
   a second optical film disposed in the third opening, wherein the second optical film is disposed on a side of the light guide plate facing away from the backlight, the second optical film is connected to the first optical film, the transflective lens is disposed on a side of the second optical film facing away from the backlight, and an orthographic projection of the photosensitive element on the transflective lens is within the transflective lens.

10. The display module according to claim 9, wherein the first optical film comprises a first diffusion sheet, a first concentrating sheet, second concentrating sheet, and second diffusing sheet arranged sequentially in a second direction from the reflective sheet to the light guide plate;

the second optical film comprises a third diffusing sheet connected to the first diffusing sheet, a third concentrating sheet connected to the first concentrating sheet, a fourth concentrating sheet connected to the second concentrating sheet, and a fourth diffusing sheet connected to the second diffusing sheet; and the third diffusing sheet, the third concentrating sheet, the fourth concentrating sheet, and the fourth diffusing sheet are sequentially arranged along a first direction from the backlight to the light guide plate.

11. The display module according to claim 9, further comprising a housing for accommodating the backlight unit, wherein a through-hole is defined in the housing at a position corresponding to the photosensitive element, and the photosensitive element is disposed in the through-hole.

12. A display device, comprising a display panel and the display module according to claim 1, wherein the display panel is located on a light-emitting side of the display module.

13. The display device according to claim 12, wherein the plurality of the microstructures are arranged in an array;

in the second region, sizes of the microstructures arranged in a same column are same, distances between two adjacent columns of the microstructures gradually decrease, or sizes of the microstructures in columns gradually increase along a first direction from the backlight to the light guide plate.

14. The display device according to claim 13, wherein the photosensitive element is located at an end of the display module where the backlight is located, and the plurality of the microstructures are arranged in a first column, a second column, and a third column arranged along the first direction;

sizes of the microstructures of the first column in the first region are larger than sizes of the microstructures of the first column in the second region, the sizes of the microstructures of the first column in the first region are smaller than sizes of the microstructures of the second column in the second region, and sizes of the microstructures of the second column in the first region are greater the than sizes of the microstructures of the second column in the second region and less than sizes of the microstructures of the third column in the second region.

15. The display device according to claim 14, wherein the photosensitive element is located at an end of the display module where the backlight is located, and the plurality of the microstructures are arranged in a first column, a second column, and a third column arranged along the first direction, a first distance between the first column and the second column in the first region is less than a second distance between the first column and the second column in the second region, and the first distance is greater than a third distance between the second column and the third column in the second region.

16. The display device according to claim 13, wherein the photosensitive element is arranged on a first end opposite to a second end where the backlight is located, the plurality of the microstructures are arranged in a first column and a second column arranged along the first direction, sizes of the microstructures of the first column in the first region are greater than sizes of the microstructures of the first column in the second region, and sizes of the microstructures of the second column in the first region are less than sizes of the microstructures of the second column in the second region.

17. The display device according to claim 13, wherein the photosensitive element is arranged on a first end opposite to a second end where the backlight is located, and the plurality of the microstructures are arranged in a first column and a second column arranged along the first direction, a distance between the first column and the second column in the first region is greater than a distance between the first column and the second column in the second region.

18. The display device according to claim 16, wherein further comprising a second reflective sheet arranged on a side of the light guide plate facing away from the backlight and correspondingly to the backlight.

19. The display device according to claim 17, wherein further comprising a second reflective sheet arranged on a side of the light guide plate away from the backlight and correspondingly to the backlight.

* * * * *